United States Patent
Woodburn et al.

(10) Patent No.: US 6,808,028 B2
(45) Date of Patent: Oct. 26, 2004

(54) METHOD AND APPARATUS UTILIZING NMR MEASUREMENTS TO GATHER INFORMATION ON A PROPERTY OF THE EARTH FORMATION SURROUNDING A WELLBORE

(75) Inventors: Charles Woodburn, Missouri City, TX (US); Ralf Heidler, Richmond, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 161 days.

(21) Appl. No.: 10/308,957

(22) Filed: Dec. 3, 2002

(65) Prior Publication Data
US 2004/0104048 A1 Jun. 3, 2004

(51) Int. Cl.⁷ .................................................. E21B 47/06
(52) U.S. Cl. ................. 175/48; 175/50; 166/250.07; 166/254.2
(58) Field of Search ................. 175/40–42, 48, 175/50; 166/250.02, 250.03, 250.07, 250.16, 254.2

(56) References Cited

U.S. PATENT DOCUMENTS

| | | |
|---|---|---|
| 5,629,623 A | 5/1997 | Sezginer et al. |
| 5,914,598 A | 6/1999 | Sezginer et al. |
| 6,032,101 A * | 2/2000 | Freedman et al. ............. 702/8 |
| 6,232,778 B1 | 5/2001 | Speier et al. |
| 6,237,404 B1 | 5/2001 | Crary et al. |
| 6,246,236 B1 | 6/2001 | Poitzsch et al. |
| 6,255,817 B1 | 7/2001 | Poitzsch et al. |
| 6,291,995 B1 | 9/2001 | Speier et al. |
| 6,297,632 B1 | 10/2001 | Speier |
| 6,326,784 B1 | 12/2001 | Ganesan et al. |
| 6,366,089 B1 | 4/2002 | Poitzsch et al. |
| 6,373,248 B1 | 4/2002 | Poitzsch et al. |
| 6,392,410 B2 | 5/2002 | Luong et al. |
| 6,400,149 B1 | 6/2002 | Luong et al. |
| 6,492,809 B1 | 12/2002 | Speier et al. |
| 6,518,757 B1 | 2/2003 | Speier |
| 6,518,758 B1 | 2/2003 | Speier et al. |
| 6,528,995 B1 | 3/2003 | Speier et al. |
| 6,531,869 B1 | 3/2003 | Speier et al. |
| 6,538,438 B1 | 3/2003 | Speier et al. |
| 6,566,874 B1 | 5/2003 | Speier et al. |
| 6,570,381 B1 | 5/2003 | Speier et al. |
| 2003/0098181 A1 * | 5/2003 | Aronstam et al. ............ 175/65 |

FOREIGN PATENT DOCUMENTS

GB        0787309 B1 * 4/2000

\* cited by examiner

Primary Examiner—Zakiya Walker
(74) Attorney, Agent, or Firm—Kevin P. McEnaney; Brigitte L. Echols; John Ryberg (57) ABSTRACT

A method is provided for gathering information on the pore pressure in an earth formation surrounding a wellbore. The method includes the initial steps of selecting at least one suitable property (e.g., porosity, drilling fluid composition, etc.) of the drilling environment (which is defined by the wellbore and the surrounding formation) and at least one NMR parameter (e.g., T2 distribution) in an NMR measurement response. The method selects a suitable property for which values over a plurality of wellbore depths can be correlated with the characteristics or behavior of the pore pressure in the earth formation. The method further includes conducting an NMR measurement at a plurality of wellbore depths, thereby generating an NMR response from the drilling environment. The measured values of the NMR parameter in the NMR response are then correlated with values of the suitable property. Next, the values of the suitable property are compared over the plurality of depths, and then the correspondence between the property values is correlated with the behavior of the pore pressure over the plurality of depths. In this way, the characteristics of the pore pressure in the earth formation over the plurality of wellbore depths are determined.

63 Claims, 6 Drawing Sheets

METHOD AND APPARATUS UTILIZING NMR MEASUREMENTS TO GATHER INFORMATION ON A PROPERTY OF THE EARTH FORMATION SURROUNDING A WELLBORE

BACKGROUND OF THE INVENTION

The present invention relates generally to a method and apparatus for conducting drilling operations in an earth formation and, in the alternative, for gathering information on the properties or characteristics of the earth formation surrounding a wellbore. More particularly, the present invention relates to such an apparatus and method that utilizes nuclear magnetic resonance (NMR) measurements to determine, evaluate, predict, or otherwise gather certain properties of the earth formation.

In one preferred application of the invention described herein, information on the pore pressure in the formation surrounding the wellbore is derived from NMR measurements. Such pore pressure formation can play an important role in the progress of the drilling operation. For example, knowledge of the behavior of the pore pressure within the formation can help in optimizing the type and composition of the drilling fluids used (more commonly referred to as "mud" or "mud system"), particularly the fluid density ("mud weight"). Specifically, it is important during the drilling operation to avoid a large pressure differential between the mud column and the formation fluids. Excessive pressure in the mud column can lead to undesirable fracturing of the formation and to substantial loss of the drilling fluid. Reduced pressure in the mud column can, on the other hand, cause formation fluid to enter and disrupt the mud system. Both scenarios can lead to even more undesirable consequences if the formation fluids reach the surface in an uncontrolled manner, commonly known as a "blowout".

Several techniques have been employed to estimate the pore pressure in the formation, but with varying degrees of success. For example, sonic and seismic measurements may be employed to deliver information on the pore pressure based on the principle that the speed of sound in a fluid increases with increasing pressure. Yet another method of estimating pore pressure is to measure the surface pump pressure and mud volume at different pressures. In any event, there has been no attempt or suggestion to use NMR measurement techniques to gather information on the pore pressure within the earth formation surrounding a wellbore.

It is known, however, that nuclear magnetic resonance (NMR) measurements taken in a wellbore can provide different types of information about a geological formation. In the past, such measurements often were made after the wellbore had been drilled. Today it is possible to log NMR measurements while drilling (i.e., logging while drilling or LWD), thus saving time and providing valuable real-time information about the earth formation as drilling progresses. For example, such information can indicate the fractional volume of pore space, the fractional volume of mobile fluid, the total porosity of the formation, permeability of the formation, etc.

Several types of commercially available logging tools are employed to perform the NMR measurements. These tools generally include one or more large permanent magnets or electromagnets for generating a static magnetic field, $B_0$, an antenna placed proximate the formation to be analyzed, and circuitry adapted to conduct a sequence of RF power pulses through the antenna to induce an RF magnetic field, $B_1$, in the formation. The circuitry also includes a receiver adapted to detect signals induced in the antenna as a result of the RF pulse sequence. The induced signals can then be measured and processed to provide the desired information about the properties of the formation.

Typically, NMR logging tools are tuned to detect hydrogen resonance signals (e.g., from either water or hydrocarbons) because hydrogen nuclei arc the most abundant and easily detectable. In general, measurements of NMR related phenomena of hydrogen nuclei in the earth formation are performed by allowing some time for the static magnetic field, $B_0$, to polarize the spinning hydrogen nuclei of water and hydrocarbons in a direction substantially aligned with $B_0$. Then angle between the nuclear magnetization and the static magnetic field, $B_0$ can be changed by applying a sequence of RF pulses to induce the RF field $B_1$. Commonly, the pulse sequence employed includes a first RF pulse (i.e., the excitation pulse) having a magnitude and duration selected to re-orient the nuclear magnetization by about 90 degrees from the orientation attained as a result of $B_0$ (i.e., the initial transverse magnetization). After a selected time, a train of successive RF pulses is applied (i.e., inversion or refocusing pulses), each of which has a magnitude and a direction selected to re-orient the nuclear spin axes by about 180 degrees from their immediately previous orientations. The frequency of the RF field needed to re-orient the nuclear magnetization (i.e., the Larmor frequency) is related to the amplitude of the static magnetic field $B_0$ by the gyromagnetic ratio $\gamma$, which is unique to each isotope.

Due to inhomogeneities in the magnetic field $B_0$, the spins in the perpendicular plane (x,y-plane) typically lose their phase coherence rapidly leading to a rapid signal decay. After each of the 180 degree RF pulses the spins are reoriented in a way such that they re-gain their phase coherence leading to the re-appearance of a signal-the spin echo. Measurement of the rate at which the spin echoes decay (i.e., the rate at which the spinning nuclei lose their alignment within the transverse plane) is referred to as a relaxation, or $T_2$ measurement. As is known in the art, the $T_2$ measurement may be related to the chemical and physical properties of the earth formation. For example, hydrogen nuclei in viscous oils have relatively short relaxation times, whereas hydrogen nuclei in light oils have relatively long relaxation times. Similarly, hydrogen nuclei in free water typically have longer relaxation times than those in bound water (e.g., clay-bound water).

SUMMARY OF INVENTION

In one aspect of the invention, a method is provided for gathering information on the pore pressure in an earth formation surrounding a wellbore. The method includes the initial steps of selecting at least one suitable property (e.g., porosity, permeability, hydrogen index, drilling fluid composition, etc.) of the drilling environment (which is defined by the wellbore and the surrounding formation) and at least one NMR parameter (e.g., T2 distribution) in an NMR measurement response. A suitable property is selected for which values over a plurality of wellbore-depths can be correlated with the characteristics or behavior of the pore pressure in the earth formation. The method further includes conducting an NMR measurement at a plurality of wellbore depths, thereby generating an NMR response from the drilling environment. The measured values of the NMR parameter in the NMR response are then correlated with values of the suitable property. Next, the values of the suitable property are compared over the plurality of depths, and then the correspondence between the property values is correlated with the behavior of the pore pressure over the plurality of depths. In this way, the characteristics of the pore pressure in the earth formation over the plurality of wellbore depths are determined. In a variation of the inventive method, the values of the selected NMR parameter over a plurality of depths are also correlated with values of the suitable property (to first determine the behavior of the suitable property) and then the behavior of the suitable property is correlated with the behavior of the pore pressure.

In another aspect of the invention, the inventive method includes the initial steps of selecting at least one suitable property of the drilling environment, whereby variations in the suitable property over a wellbore depth interval can be correlated with variations in the pore pressure in the earth formation, and predicting a profile of the suitable property over a wellbore depth interval (e.g., through historical information or preliminary measurements). Further, at least one NMR parameter is selected, such that values of the NMR parameter over the depth interval can be correlated with values of the suitable property over the depth interval. After providing an NMR measurement apparatus, the drilling operation may then commence so as to initiate forming of the wellbore.

During drilling, the NMR measurement apparatus is operated at a depth in the wellbore to generate an NMR response from the drilling environment and to account for the NMR parameter in the NMR response. By repeating this procedure at a plurality of wellbore depths and providing values of the NMR parameter at these depths, an actual profile of the suitable property is established. Deviations of the actual profile from the predicted profile may then be correlated with variations in the pore pressure in the earth formation.

In the above method, the suitable property selected may be, among other things, porosity, permeability, hydrogen index, a drilling fluid property such as composition, a formation fluid property such as composition, or combinations of these. In one specific application, the suitable property selected is depth of fluid invasion, and the NMR measurements are directed to a near-wellbore region of the drilling environment.

In yet another aspect of the invention, the invention is directed to a method of drilling a wellbore in an earth formation. The method includes the steps of commencing drilling of the wellbore in the earth formation, using drilling fluid having a fluid composition, and while drilling, monitoring the pore pressure in the earth formation surrounding the wellbore. The monitoring step further involves selecting at least one suitable property of the drilling environment such that variations in the suitable property over wellbore depths can be correlated with variations in pore pressure in the earth formation. Then, NMR measurements are obtained at a plurality of wellbore depths, thereby generating an NMR response from the surrounding wellbore over the plurality of wellbore depths. From the NMR response, the behavior of the suitable property over the wellbore depths is determined and then, the behavior of the suitable property over the wellbore depths is correlated with the behavior of the pore pressure in the earth Other aspects of the invention are described in the Detailed Description, or specified in the appended claims. For example, the invention is also directed to a system and a tangible medium suitable for use, or at least associated with, the methods described above.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

In one aspect of the invention, a method is provided that utilizes nuclear magnetic resonance measurements (NMR) to evaluate, determine, predict, or otherwise characterize the pore pressure profile (pore pressure with respect to depth) in the earth formation surrounding a wellbore. Such pore pressure information may be gathered during or simultaneously with the drilling operation (e.g., measurement/logging while drilling) or after the drilling operation is completed. In another aspect of the invention, the method utilizes pore pressure information gathered in this manner during the actual conduct of the drilling operation. In the case of an LWD application, pore pressure information gathered during the drilling operation can provide important benefits, including improving the safety and efficiency of the drilling operation. As discussed below, the discovery of an overpressure or underpressure condition may warrant altering the drilling operation in a number of ways, including calling for an immediate stop to the drilling operation to address a blowout risk and/or for an adjustment to the mud system.

Figures 1, 3:
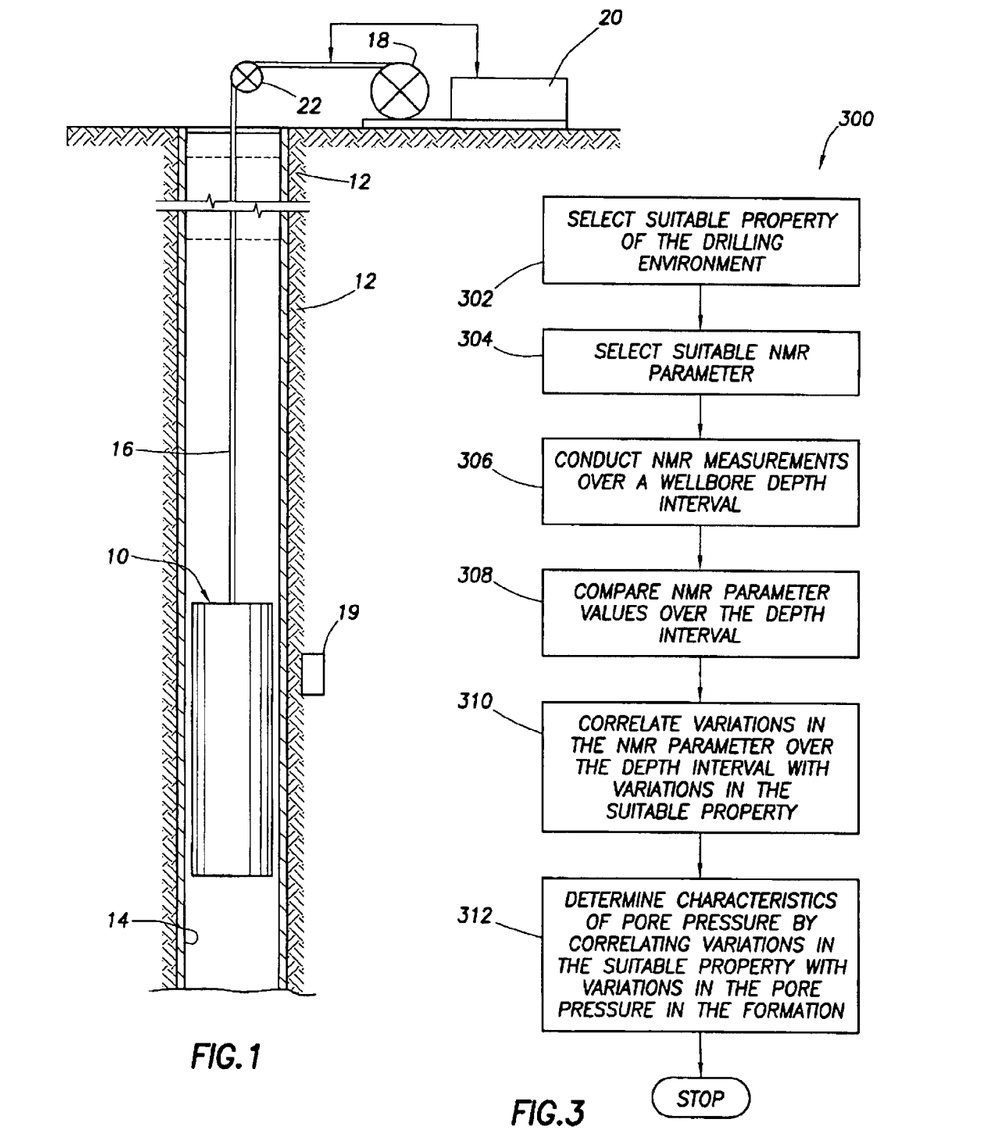
FIG. 1 is a simplified schematic of a wellbore and a system for conducting NMR measurements in the wellbore.
FIG. 3 is a flow chart illustrating a method for gathering pore pressure according to the invention.
Figure 2:
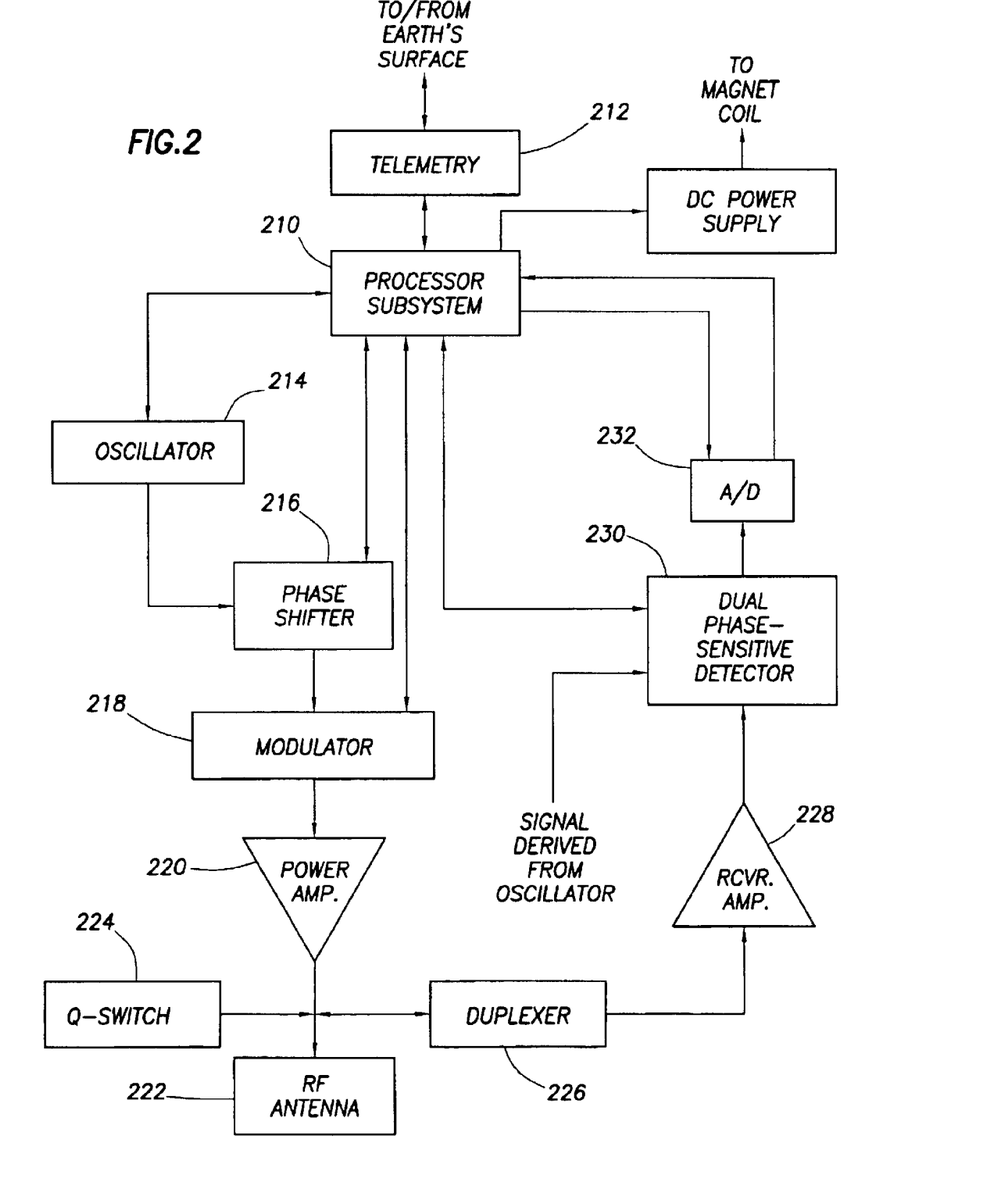
FIG. 2 is a simplified circuit diagram for use with the system of FIG. 1.

To facilitate description of the various aspects of the invention, the Figures, and the descriptions thereof, focus on exemplary methods of gathering information on a property of the earth formation surrounding the wellbore, particularly the pore pressure. It should be understood, however, that the scope of the invention extends beyond these exemplary methods, and that various aspects of the inventive methods or the methods themselves are suitable for other applications related to the gathering of information on the drilling environment and/or the drilling operation. In any event, FIGS. 1 and 2 illustrate an exemplary NMR measurement apparatus capable of performing the NMR measurements utilized in these methods. FIGS. 3–6 are provided to help illustrate exemplary methods of gathering pore pressure information or of conducting drilling operations utilizing such NMR measurements and pore pressure information, each of which embodies various aspects of the invention.

The simplified schematic of FIG. 1 depicts an NMR measurement apparatus in the form of a wireline conveyed logging tool 10. The logging tool 10 is designed for investigating one or more earth formations or zones within a formation 12 traversed by, or otherwise located in the vicinity of a wellbore 14. In a typical application, the logging tool 10 is suspended in the wellbore 14 on an armored cable 16, the length of which substantially determines the relative depth of the logging tool 10. The cable length is controlled by any suitable means, such as a drum and winch arrangement 18 at the surface.

The NMR measurement apparatus or logging tool 10 may be any suitable downhole NMR logging device adapted for either wireline logging applications or logging-while-drilling (LWD) applications. As will become apparent, the method of the present invention is equally adapted for either application. The logging tool 10 includes a permanent magnet, an electromagnet, or a magnet array for generating a static magnetic field $B_0$ in a volume of interest 19 in the formations, one or more RF antennae (e.g., solenoid antennae, loop antennae, saddle antennae, etc.), and circuitry configured to produce pulses of RF power to induce the RF magnetic field $B_1$ in the formations and for receiving the spin echoes detected from the formations.

A surface recording system 20 provides electrical power to the logging tool 10, and signals detected by the tool 10 arc returned to system 20 for recording and interpretation via the armored cable 16. Typically, the surface recording system 20 maintains a log of the detected spin echoes with respect to the depth of the logging tool 10. In the embodiment illustrated, output signals representative of depth are provided by a cable length measuring encoder 22. Alternatively, the surface recording system 20 may maintain a log of the detected spin echoes with respect to time. Later, the time-based measurements may be correlated with a log of depth measurements such that depth-based measurements may be derived.

FIG. 2 illustrates, in simplified block diagram form, an exemplary embodiment of downhole circuitry associated with the logging tool 10 and configured to produce the RF pulses and detect the spin echoes. In general, the circuitry generates an RF signal which is transmitted through an antenna to induce an RF magnetic field in the earth formations. Spin echo signals generated as a result of the RF magnetic field are detected by the antenna and are either stored or transmitted back to the earth's surface for logging by the surface recorder system 20. One skilled in the art would appreciate that other embodiments of circuitry may be used without departing from the scope of the invention.

As shown in FIG. 2, the downhole circuitry includes a processor subsystem 210 having associated memory, timing circuitry, interfaces, and selected peripheral devices (not separately shown). The processor subsystem 210 is coupled with a telemetry circuitry 212, that communicates with the surface recording system 20. The processor subsystem 210 may include or may be operatively associated with programmable means for executing processes that convert NMR data into useful information on the properties of the drilling environment.

The pulse forming circuitry includes a variable frequency oscillator 214 that, under control of the processor subsystem 210, generates an alternating RF signal at the desired frequency. The output of the oscillator 214 is coupled to a phase shifter 216, that provides for control of pulse phases, and a modulator 218, both of which are under control of the processor subsystem 210 to produce the desired pulse phases of the RF field. The output of the modulator 218 is coupled, via a power amplifier 220, to an RF antenna 222. A Q-switch 224 optionally can be provided to damp the RF antenna system to reduce antenna ringing.

In the circuitry shown, the antenna 222 both transmits the RF pulses to induce the RF field in the formations and detects the echo signals resulting from application of the RF field. Thus, as shown in FIG. 2, the antenna 222 also is coupled with a receiver section through a duplexer or switch 226, the output of which is coupled with a receiver amplifier 228. During transmitting and damping modes, the switch 226 protects the receiver amplifier 228 from the high power pulses which pass to the RF antenna 222. During the receiving mode, the duplexer 226 acts as a low impedance connection from the antenna 222 to the receiver amplifier 228. The output of the receiver amplifier 228 is coupled with a dual phase-sensitive detector 230, which also receives, as a reference, a signal derived from the oscillator signal. The output of the detector 230 is coupled to an analog-to-digital converter 232, the output of which is a digital signal representative of the detected NMR signals.

It should be understood that, although the logging tool 10 is shown as an integral or unitary device in FIG. 1, it may alternatively comprise separate components and may be combinable with other logging tools. Further, while a wireline tool is illustrated in FIG. 1, alternative forms of physical support and a communicating link with the surface can be used, for example, in an LWD application. Still further, the digital signals representative of the detected spin echoes may be transmitted to the surface recording system 20 while the tool 10 is downhole. Alternatively, the digital signals may be stored in memory by the processor subsystem 210 and later retrieved when the tool 10 has returned to the surface.

Using a logging tool such as the tool depicted in FIG. 1, several NMR parameters can be measured from which properties of the drilling environment may be derived. For example, most NMR logging instruments are configured to measure the spin-lattice (longitudinal) relaxation times ($T_1$) and/or spin-spin (transverse) relaxation times ($T_2$) of hydrogen nuclei. Such measurements may be acquired by first polarizing the nuclei by exposure to a static magnetic field $B_0$ and then applying an RF pulse (the initialization pulse) tuned at the Larmor frequency of the nuclei of interest and calibrated in length to achieve a 90 degree rotation of the spin magnetization.

An LWD tool suitable for use with the present invention is described in U.S. Pat. No. 6,246,236 (hereby incorporated by reference and made a part of the present disclosure).

Referring now to FIG. 3, a flow chart 300 is provided that describes in general terms a method of gathering information on the pore pressure in the earth formation surrounding the wellbore or, at least, in the formation wherein the wellbore is to be located. The method involves measurement of the NMR response from the area or region defined by the wellbore and the surrounding formation ("the drilling environment") over a depth interval. The drilling environment may be contained within a single homogeneous formation or zone or pass through a plurality of formation or zones. As further explained through the various examples of the inventive method, the pore pressure in the earth formation adjacent the wellbore affects certain properties of the drilling environment. Under this premise, the method according to the invention employs NMR measurement techniques to evaluate certain properties of the drilling environment over a wellbore depth interval, and from this evaluation, derives information concerning the pore pressure over the same wellbore depth interval.

A preferred initial step in the inventive method is to select one or more suitable properties (chemical or physical) of the drilling environment (302). The suitable property must be one for which the measured values or behavior over a given wellbore depth interval can be directly or indirectly related to the values or behavior of the pore pressure over the same wellbore depth interval. In particular, it has been determined that, for certain properties, variations in their values over the depth interval can be attributed to variations in the pore pressure. For example, the behavior of porosity over certain intervals of wellbore depth may be related to the behavior of pore pressure in the formation over the same depth interval. Generally, porosity will decrease with increasing depth as the higher pressure tends to compact the formation. A reversal of this general trend or profile, indicating a sharp increase in porosity in an otherwise homogeneous zone, may indicate a zone of increased pressure.

Furthermore, the porosity of the formation (or total porosity) as discussed above may be separated into two components: the bound fluid volume (BFV) and the free fluid volume (FFV). In respect to the inventive method, either of two components may be selected independently as the suitable property of the drilling environment. BFV refers to the relative share of the total porosity that is bound, whereas the FFV is the share that is not bound. More specifically, BFV represents the percent of the porosity (i.e., of the total porosity) that is in close interaction with the solid grains, especially clay particles. In many applications, it will be convenient, and even advantageous, to monitor BFV and/or FFV along with total porosity. In any event, as used herein, the term porosity may mean total porosity, BFV, FFV, or combinations of any or all of these.

Like total porosity values, BFV values tend to decrease with increasing depth, especially in shale formations, but increases in an overpressure zone. Thus, a reversal of this tend, ie., an increase in BFV in an otherwise homogeneous zone, may indicate a sudden increase in pore pressure.

Porosity is one of several properties of the drilling environment determined to be suitable for the method illustrated in FIG. 3. Other properties contemplated for use with the method according to the invention include: permeability; pore size (as determined by restricted diffusion); drilling fluid properties, including composition; formation fluid properties, including composition; drilling fluid/formation fluid invasion characteristics; and combinations of these properties.

As another initial step, the method preferably includes selecting a suitable NMR parameter (304). As explained above, NMR measurements generate a response that is unique to the environment or object onto which the NMR signal is targeted. That NMR response may be characterized by a unique set of parameters, although manipulation of the response may be required in order to observe and better evaluate certain parameters. A variety of suitable techniques are known to achieve this purpose. In the application of the inventive method, one or more of these parameters (or NMR data) is identified as having values that have some relation to the values or behavior of the selected suitable property over a given wellbore depth interval. More particularly, the selected NMR parameter is one characterized by values over a given wellbore depth interval that have some correlation with the values or behavior of the selected property of the drilling environment over the same depth interval and, thus, from which the behavior or values of the pore pressure may be derived.

With respect to porosity, the preferred NMR parameter for use is the T2 distribution in the NMR response. The NMR T2 distributions of brine are correlated to pore size distributions. Specifically, shorter relaxation times are correlated with better compaction or smaller pore size. The T1 distribution (not affected by diffusivity) may also be selected, possibly in addition to T2 distribution.

Referring again to FIG. 3, the preferred method calls for NMR measurements to be conducted at a plurality of wellbore depths (e.g., over a wellbore depth interval), thereby generating an NMR response from the drilling environment (306). The measurements may be taken continuously through the depth interval, or periodically over time or depth. Typically, a large amount of geological information is available on the characteristics of the various zones or formations in which the wellbore is to be drilled. Of particular interest are the depths at which the transitions between zones or formations are located. The frequency and location of these transitions may dictate the extent of the depth interval in step 306 and, in the case of periodic measurements, the number and frequency of measurements. Marked variations unrelated to overpressure or underpressure in properties are common at such variations; therefore, care must be taken not to misinterpret or prematurely respond to such variations. In any case, the depth interval referred to in step 306 may be a discreet interval within the entire depth of the wellbore, as for example within a homogeneous zone, or extend the entire wellbore depth encompassing several zones and formations.

Moreover, the type of NMR measurement will vary depending on the drilling environment property sought. For example, when values of porosity or permeability are targeted, the NMR measurement will be directed so as to generate a response from deep within the surrounding earth formation. NMR measurement techniques and equipment suitable for such measurements are described in U.S. Pat. Nos. 6,246,236 and 6,232,778, each of which is hereby incorporated by reference and made a part of the present disclosure.

As further described below, NMR measurements may also be directed into and around a region of the drilling environment wherein the interface between formation fluids and drilling fluids is normally found. This region may be centered anywhere between about 1" to 2" from the outer face of the wellbore, and is commonly referred to as the near-wellbore region. The near-wellbore region is susceptible to invasion by drilling fluids, that displace or mix with the formation fluid due to excess pressure in the wellbore relative to the pressure in the formation. The invasion front within the wellbore will, therefore, vary with depth and differential pressure. NMR measurement techniques and equipment directed to this region are described in U.S. Pat. No. 6,246,236, which is also hereby incorporated by reference and made a part of the present disclosure. These types of NMR measurements may be utilized to gather information on properties related to the drilling fluid, including the drilling fluid composition and the degree and rate of drilling fluid invasion into the region normally occupied by formation fluid. Drilling fluid properties may also be derived from measurements directed to the formation fluid (i.e., formation fluid properties). Specifically, the composition and location of the formation fluid in the near-wellbore region can reveal properties of the drilling fluid. The utilization of these types of NMR measurements in the present invention is described below with respect to the alternative methods illustrated through FIGS. 5 and 6.

Figure 3A:
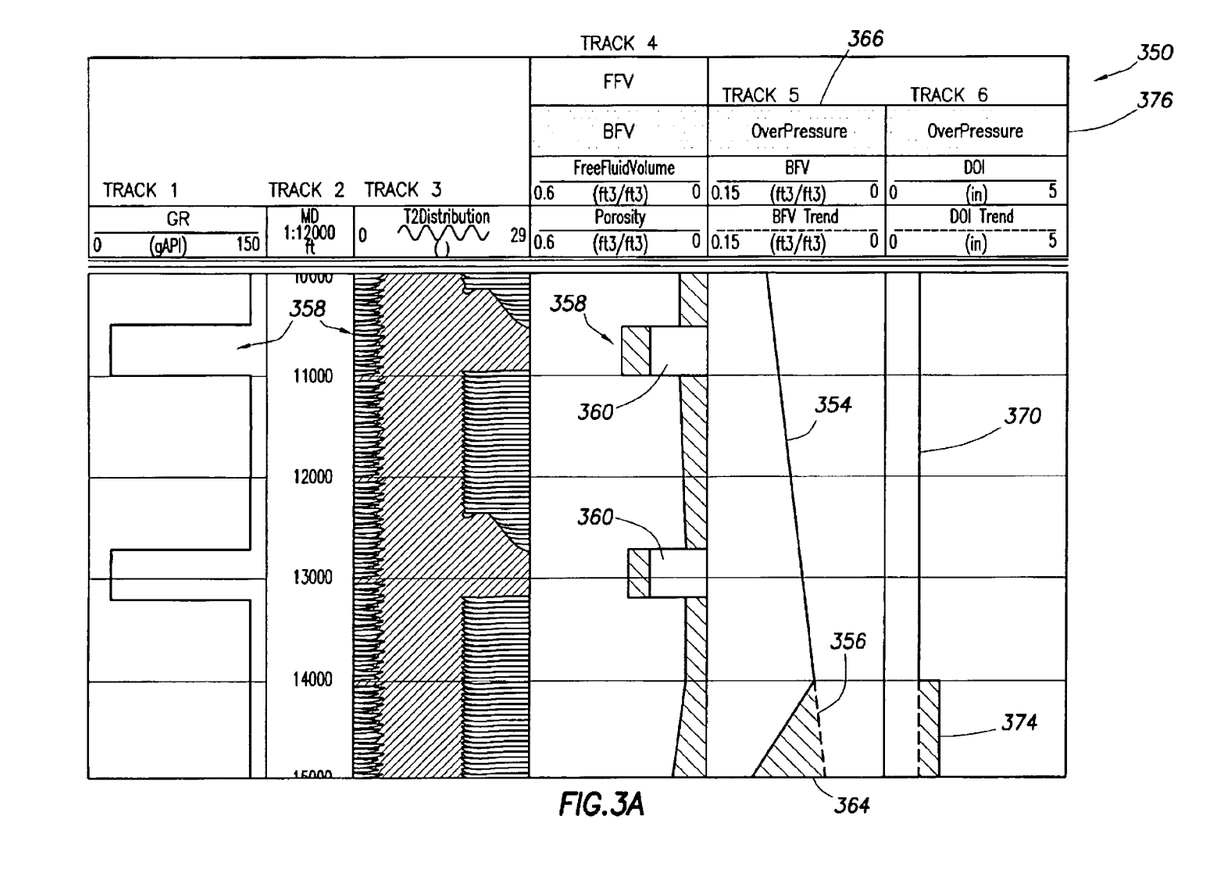
FIG. 3A is a representative well log suitable for use with various methods according to the invention.

Preferably, values of the NMR parameter(s) and the property of the drilling environment are outputted onto a well log or well data screen such as the one depicted in FIG. 3A. As values of the NMR parameter are received by the processor subsystem (see FIGS. 1 and 2), these values become input to a computer software/program residing thereon. The computer program may embody any one of several known processes for correlating the NMR parameter values with values of the selected drilling environment property (312). Preferably, execution of the software or program generates values for the drilling environment property over the depth interval. These values are then outputted onto the well log 350 alongside the NMR parameter, as shown in FIG. 3A. Examples of processes suitable for correlating values of T2 distributions with values of porosity or permeability are described in U.S. Pat. Nos. (or SPE paper no.) SPE30560 and SPE49010, each of which is hereby incorporated by reference and made a part of the present disclosure.

As shown in FIG. 3, a plurality of NMR measurements may have to be taken to establish a sufficient number of values for the suitable property or in the alternative, to establish some profile or trend over a sufficiently indicative depth interval (step 308). This allows the drilling operator or some other user or automated process to compare the measured or actual values of the suitable property over the depth interval, thereby evaluating the behavior of the suitable property. Of particular interest is whether the measured values are relatively constant or increase or decrease gradually, or deviate sharply over depth. How the values compare or correspond with one another can then be correlated with the behavior of the pore pressure. If, for example, the actual values of porosity gradually increase with depth over a known homogeneous zone, the pore pressure may be determined as also increasing with depth in the normal manner and unaffected by sudden pressure changes. On the other hand, if the otherwise gradual increase (the profile) is interrupted by a section of sudden decrease or increase, the pore pressure over the depth interval may be determined as being interrupted by an overpressure or underpressure zone respectively. In the flowchart of FIG. 3, this comparison of the property values over the depth interval amounts to a step of determining or predicting the characteristics of the pore pressure in the earth formation (312).

Preferably, the values of the NMR property and the property of the drilling environment are outputted onto a well log such as that depicted in FIG. 3A. In an LWD application, the values are preferably logged during drilling, such that the property and, thus, the pore pressure may be monitored throughout the drilling operation. During drilling, the well log may be available on a continuous paper printout or a digital display, thereby allowing for realtime or nearly simultaneous monitoring. In alternative embodiments, the logging software may be further equipped with alarm or indicating means to monitor for certain undesirable behavior of the suitable property and the pore pressure or for values exceeding predetermined levels of the suitable property or pore pressure. For purposes of the present Detailed Description, the term "well log" shall mean any display or observable representation reflecting values of the NMR parameters, drilling environment properties, and other well information.

The well log of FIG. 3A is a simplified representation of a suitable well log 350 for use with the inventive method, apparatus, and system. The well log 350 provides values for Gamma Ray log and well depth in Tracks 1 and 2, respectively. The selected NMR parameter, T2 distribution, is displayed in Track 3. The suitable drilling environment property selected is porosity, the values of which are displayed in Track 4. In one respect, the well log 350 is a simplified representation because, in a more common application, various NMR parameters may be logged along with the three common porosity properties and perhaps permeability. Such a suite of NMR data and NMR-derived property values may be further complemented with other physical measurements obtained through conventional methods. In this way, a more accurate or more fail-safe monitoring of the conditions at the drilling environment and of pore pressure conditions may be achieved. The manner by which a method, apparatus, or system may employ these various resources will become apparent to one skilled in the geophysical, petrophysical, or other relevant art upon reading the present Detailed Description and/or viewing the various accompanying Figures.

In the exemplary well log 350, the T2 and porosity values are logged over several known zones in the formation. The BFV values or profile 354 is logged separately in Track 6. The values follow the expected profile (shown in dash lines 356) through the first three zones with the BFV values decreasing gradually with depth before approaching zone transition areas 358. These zone transition areas 358 are characterized, and thus highlighted, by sudden changes in T2 distribution and in FFV values (see 360). Gradual decrease in BFV values is interrupted, however, as drilling continues in the subsequent zones. Specifically, the BFV values increase sharply starting at a depth of about 14,000' thereby indicating a sudden increase in pore pressure. In the well log 350, this sudden increase is highlighted by flag 364 and flag 366. In particular, flag 366 is an alert indication (e.g., red audible alarm) alarming the user of the possible overpressure condition.

In an LWD application, such an occurrence may warrant stoppage of the drilling operation. In some applications, additional measurements or further investigation may be performed to confirm the overpressure condition. The overpressure condition may then be addressed by adjusting the drilling technique (for example, by increasing the density of the drilling fluid composition or reducing the pump flow rate).

Use of the well log 350 (and the flowchart of FIG. 3) provides an example of how the characteristics of the pore pressure over a depth interval may be determined and how such information may be utilized in the conduct of a drilling operation. To highlight the change in pore pressure, well log 350 is also provided with an extrapolation of the predicted or normal pressure values, thereby establishing the predicted or normal profile. The predicted profile appears as an extension in dash lines (365) to the actual profile of the measured or actual BFV values (the actual profile 354). When the actual profile 354 deviates from the predicted profile 356, both profiles appear and remain on the log, and the difference (represented as the area 364) highlighted (e.g., in red). This allows the user to evaluate and even quantify the degree by which the actual values deviate from the otherwise normal values, thereby evaluating the degree of overpressure.

Figure 4:
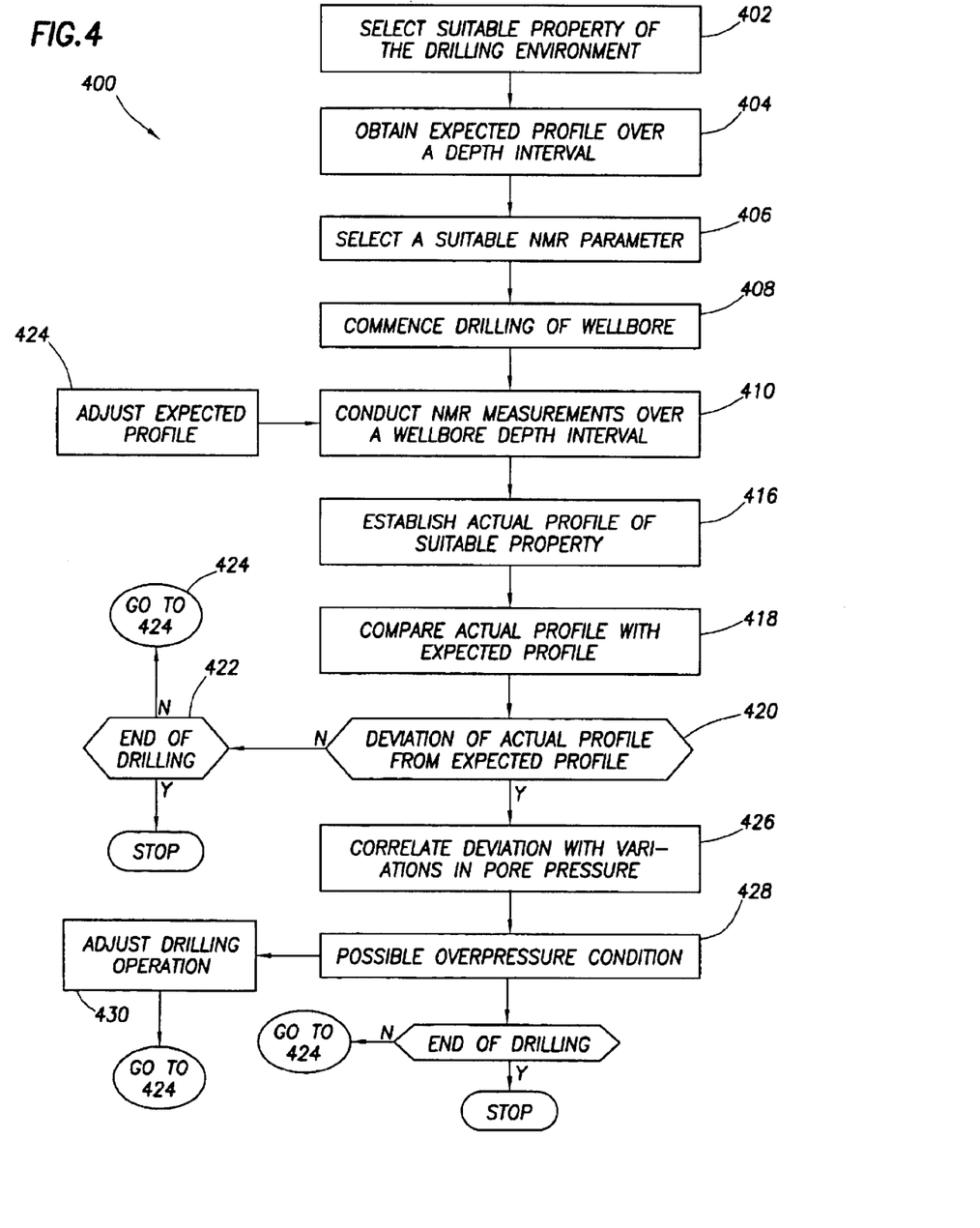
FIG. 4 is a flow chart illustrating a method of conducting a drilling to the invention.

FIG. 4 provides a variation of the general method as described with respect to the flowchart FIG. 3. In particular, the method embodied in the flowchart 400 of FIG. 4 utilizes a comparison of a predicted profile of the drilling environment property over a depth interval with an actual profile as derived from NMR measurements. Moreover, the flowchart 400 in FIG. 4 illustrates a method of drilling a wellbore utilizing NMR measurements.

In an initial step 402 of the method, a suitable property of the drilling environment is selected. In accordance with the invention, the suitable property selected is such that variations in the property's values over a wellbore depth interval can be correlated with variations in the pore pressure of the formation. As mentioned above, a large amount of information may be known about the subject formation even before drilling and before conducting the NMR measurements. Form this body of historical information, an expected or predicted profile of the physical property over the given wellbore depth interval is obtained (414). The predicted profile represents the expected or normal behavior of the property over a depth interval, and serves as the baseline for monitoring the pore pressure. Thus, in many applications, the predicted profile represents the pore pressure conditions by which the drilling operation is designed. If the actual profile corresponds directly with the predicted, the drilling operation is likely to advance as planned.

Preferably, the predicted profile is illustrated in a well log 450 as shown in FIG. 3A. The predicted profile is provided over varying depths in the wellbore, and over different zones. It is typical that the profile in each zone will be unique for that zone and perhaps independent from the other zones. Thus, in one respect, the predicted profile may be regarded as a collection of predicted profiles over multiple zones.

In another initial step of the method, at least one suitable NMR parameter is selected (406). A suitable NMR parameter is one characterized by values over the depth interval which may be correlated with those of the selected suitable property. In particular, the NMR parameter is selected such that variations in its values over a wellbore depth interval can be correlated with variations in the property over the same depth interval. In this way, the behavior of the suitable property may be derived from the NMR measurements. If porosity is selected as the physical property, the $T_2$ distribution in the NMR response is preferably selected as the NMR parameter.

After the above initial steps are completed, drilling of the wellbore begins (408). Then, using an NMR measurement apparatus (preferably an LWD tool in the present case), measurements are taken over a wellbore depth interval (410). As mentioned previously, the NMR measurements may be made periodically at successive depth intervals or at incremental time periods, or continuously throughout a wellbore depth interval. In respect to the method of FIG. 4, the referenced well bore depth interval may mean a depth interval within a zone or through a plurality of zones, or extend the entire wellbore depth.

The NMR response is preferably transmitted uphole via conventional telemetry means and received by a processor subsystem of the surface recorder system. As discussed above with respect to the flowchart of FIG. 3, values of the physical property are derived from the measured NMR parameter values using a known correlation and processing technique. The values of the NMR parameter and the physical property are then outputted onto well log 450. By logging a number of values of the physical property over the initial depth intervals, the actual profile of the physical property is established (416).

As shown in FIG. 3A, the actual profile 354 may be logged in the same track as the predicted profile 356, so that it overlies the predicted profile 356. In many applications, this will greatly facilitate the subsequent steps of comparing the two profiles (418) and determining whether the actual profile deviates or varies from the expected profile (420). If the actual profile does indeed deviate or vary from the expected profile, the deviation or variation may be correlated with variations in the pore pressure (426) in accordance with the present invention. Typically, at such an occurrence, the well log (which will likely include other NMR data and measurements) will be analyzed further and perhaps, additional measurements and tests (e.g., from the surface) will be conducted. In this manner, the operator determines or confirms whether an overpressure zone has been detected (428).

Referring to the well log 450 of FIG. 4A, an overpressure or underpressure zone may be indicated by a sharp deviation from the predicted profile. If such an overpressure/underpressure situation is confirmed, the drilling operation may be adjusted to compensate or otherwise address the overpressure or underpressure zone (430). In some cases, the drilling operation may be halted. In many instances, the overpressure/underpressure zone will be addressed by adjusting the fluid composition of the drilling fluid. For example, weighting agents may be added to increase the weight and fluid density. Also, the pump flow rate may be varied, the drilling rate may be reduced, or controlled drilling implemented. In some instances, drilling may be stopped and the casing may be set (sooner than planned). In any of these situations, the adjusted drilling will deviate from the original plan. Additionally, various measurements may be made, such as seismic surveys, to further evaluate the drilling conditions. Thereafter, the drilling operation may be re-started (408), followed by additional NMR measurements being conducted at subsequent depths (410).

In a further aspect of the invention, the inventive method allows for the expected profile to be adjusted during the drilling operation (424), thereby providing for a more accurate monitoring of the drilling operation. Specifically, the expected profile may be adjusted by incorporating the actual measurements of the NMR parameter and suitable property at preceding depths. Preferably, the predicted profile is adjusted in real time and simultaneous with the logging of the actual profile. For example, the increase in porosity over varying depths may be sharper or more rapid than originally predicted due to unexpected changes in the geological model. In view of this, the predicted profile may be adjusted to reflect the true profile.

In the case of certain physical properties such as porosity and permeability, the predicted profile may be obtained from historical information. For example, the porosity of the subject formation or zones may have been previously logged using surface techniques such as seismic or sonic measurements. Alternatively, the predicted profile may be obtained from historical information on similar zones or formations, particularly formations surrounding offset wells. Further yet, the predicted profile may be established by taking initial measurements within a homogeneous zone and extrapolating the initial profile over the rest of the zone.

The property of the drilling environment selected may be one attributed to the drilling fluid, such as the drilling fluid composition. In several applications, the drilling fluid property selected concerns the interaction between the drilling fluid and the formation fluid in the near-wellbore region (e.g., the depth or rate of drilling fluid invasion). In these cases, the predicted or base profile may reflect a nearly constant value over a short depth interval. The inventive method is then employed to monitor for sharp deviations from this constant profile. In many of these cases, the predicted profile is established by taking measurements at the well surface using conventional means. Alternatively, measurements may be conducted near or at the surface utilizing NMR measurements of the drilling fluid or formation fluid. The profile obtained in this manner is then extrapolated over the wellbore depth interval by way of a vertical line (see, e.g., line 370 in well log 550). The flowcharts of FIGS. 5 and 6 focus on a variation of the inventive method that utilizes methods in which the suitable property selected concerns the drilling fluid or formation fluid. In these instances, properties directed to the formation fluid content in the wellbore region is, in essence, a property of the drilling fluid, because it normally reveals something about the invasion front.

Figure 5:
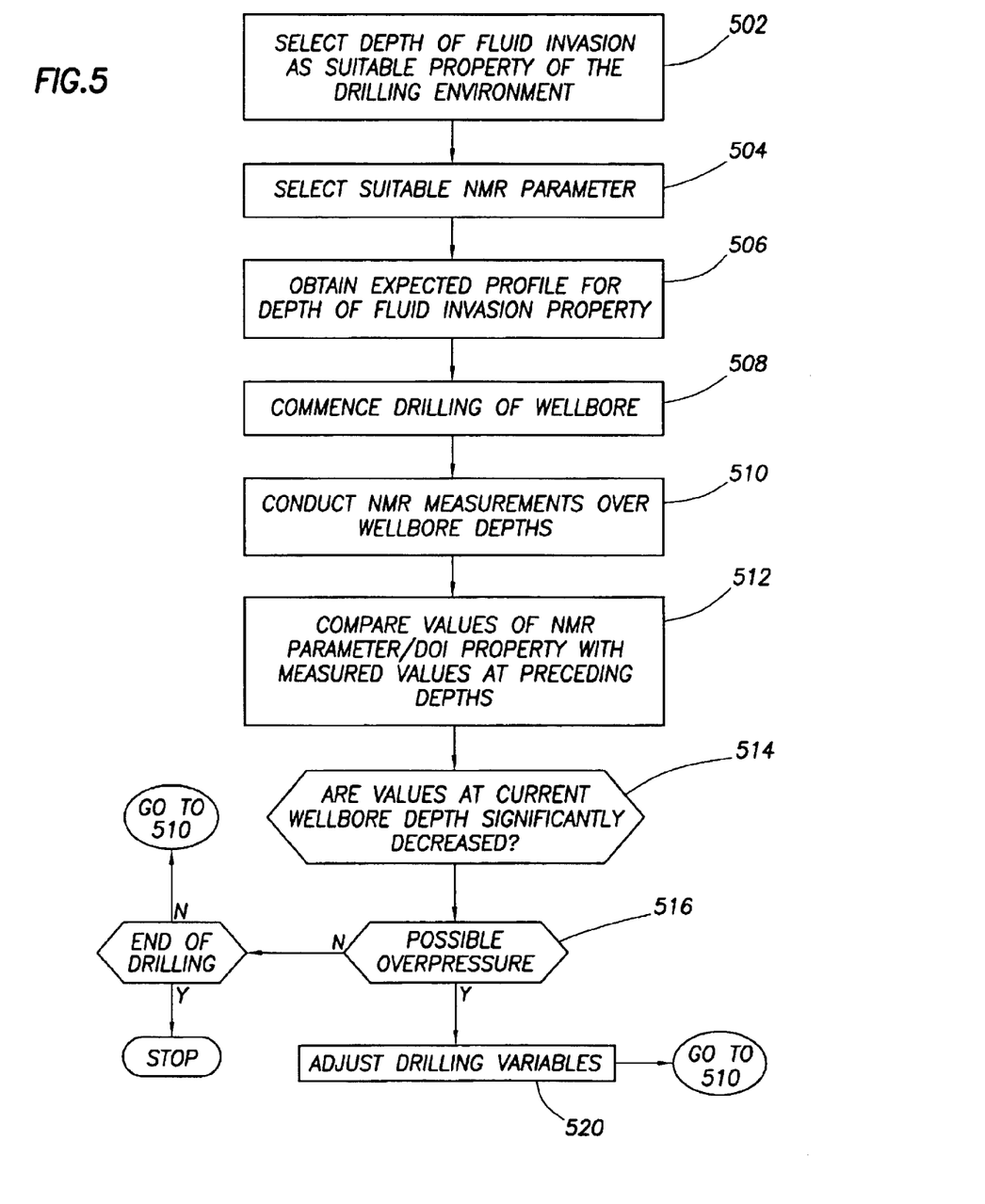
FIG. 5 is a flow chart illustrating an alternative method according to the invention.

Referring now to the flowchart of FIG. 5, there is illustrated a method of conducting drilling operations.

Specifically, an initial step of the method is the selection of at least one suitable property of the drilling environment provided in a near-wellbore region of the drilling environment (502). Specifically, the property selected is the depth of formation fluid invasion. During drilling, the balance of fluids inside the formation is disturbed. Usually, the pressure of the mud in the wellbore is higher than the pressure of the native formation fluid (overbalance drilling). This pressure deferential leads to an invasion of the drilling fluid or mud into the formation and, a replacement of the native formation fluid by mud filtrate in a region surrounding the wellbore (known as the invaded zone). This invaded zone is within the near wellbore region which is the subject of the NMR measurement. The invading mud usually contains fine particulate matter, that is quickly filtered out onto the sides of the wellbore to form a layer known as the "mudcake". The resulting mudcake build-up is a desirable effect because it reduces communication between the formation and the mud column, thereby preventing or hindering the further flow of mud into the formation. In an overpressured zone, the mud will not invade the formation but rather, the formation fluid may tend to enter the mud column. This, of course, is an undesirable result, because the mud system may be diluted thereby changing the mud weight and density.

Modern NMR measurement tools often employ a magnetic field that decays from the tool away into the formation (known as a gradient design). Such a tool allows an operator to measure the NMR signal in a shell around the tool. The position of the shell can be chosen by selecting a suitable frequency fulfilling the larmor resonance residence condition at the desired distance (or depth) from the tool. It is, therefore, possible to perform NMR measurements at different depths of investigation. Because the pressure deferential between the mud and the formation fluid influences the invasion profile and speed, measurement of the mud filtrate content with respect to depth can give valuable information about the invasion process and, thus, about the pore pressure. In the alternative, measurement of changes in the invasion profile over time may further yield valuable information. A slower invasion may indicate a higher formation pressure and vice versa. Similar approaches may be adopted using invasion profiling from a different technique (e.g., resistivity) in combining this with NMR derived rock property measurements to estimate pore pressure. In any event, measurements of the depth of fluid invasion, or more particularly, variations in the depth of fluid invasion over wellbore depths, may be correlated with variations in the pore pressure in the surrounding earth formation.

In another initial step of the inventive method of FIG. 5, at least one NMR parameter is selected (504), whereby variations in NMR parameter over the depth interval can be correlated with variations in the depth of fluid invasion. Preferably, a suite of NMR parameters will be selected. The NMR parameters will typically include T2 distributions across the gradient field, so as to distinguish between the presence or volume of native formation fluid and invading drilling fluid, such as mud filtrate. In this manner, the depth of invasion at a particular depth may be evaluated.

Over a wellbore depth interval, it is desirable for the depth of invasion to remain relatively constant. Accordingly, the predicted or base profile obtained for the depth of formation fluid invasion through the wellbore depth interval is a nearly constant vertical line (see, e.g., line 370 in FIG. 3A) (see step 506). It should be noted, however, that it may be common to see some (but not sudden) variations in the depth of formation fluid invasion, due to minor effects unrelated to overpressure or underpressure, e.g., increasing depth and pressure buildup.

Typically, the predicted or base profile may be established from initial NMR measurements near or at the surface, and then extrapolated over the wellbore depth interval. Upon establishing the predicted or base profile, drilling of the wellbore commences (508). In a subsequent step 510, NMR measurements are then conducted at a plurality of wellbore depths or depth interval, either continuously or periodically. As mentioned above, the NMR measurements are directed, preferably using a gradient type tool, to generate an NMR response from the near wellbore region. In particular, the NMR response will come from the near-wellbore region including at and around the invasion front. Upon collection of a sufficient number of NMR parameter values and depth of invasion values, the values of the NMR parameters and thus the depth of invasion, are compared over the wellbore depth. Typically, this information will be provided on a well log in the form of radial profile over depth. More particularly, the values are compared continuously throughout the drilling, so as to monitor for sharp deviations from the base profile (512).

As indicated by step 514 in flowchart 500, an inquiry is made as to whether the values of the NMR parameters (or suitable property) at a current wellbore depth have significantly increased from values at preceding wellbore depths (514). A decrease in the values, particularly a sudden decrease, generally indicates the possibility of an overpressure zone. Thus, the next step in the method is to further evaluate or confirm the possibility of an overpressure zone (516). If further evaluation confirms overpressurization, the drilling operation may be halted and/or the drilling variables adjusted (520), as discussed previously. Further, if no significant decrease or increase in the values are detected, the drilling operation continues as normal, and further additional NMR measurements are conducted.

If the pressure of the formation fluid is much higher than the pressure of the mud column (overpressurization), the formation fluid will flow into the mud column. This affects the NMR measurements similar to tool motion or diffusion. Specifically, shortened T2 distributions may be detected as well as a change of the echo shape. Accordingly, the T2 distributions and echo shapes are typically selected as the suitable NMR parameter. With respect to the echo shape, the effect of the lateral tool motion will be very small in the inventive method, because the LWD NMR tool is symmetric, such that the opposing effects on two sides of the tool cancel one another to a high degree. A flow of fluid inward (formation fluid entering the wellbore) or outward (fast invasion or loss of circulation), however, does not lead to this cancellation so that the effect on the echo shape will be more pronounced.

In the well log 350 of FIG. 3A, Track 6 provides a log of depths of in (DOI) over depth. Starting at about 14,000', the DOI increases sharply, thereby indicating a possible overpressure zone. This condition is highlighted by the overpressure alarms 374 and 376.

Figure 6:
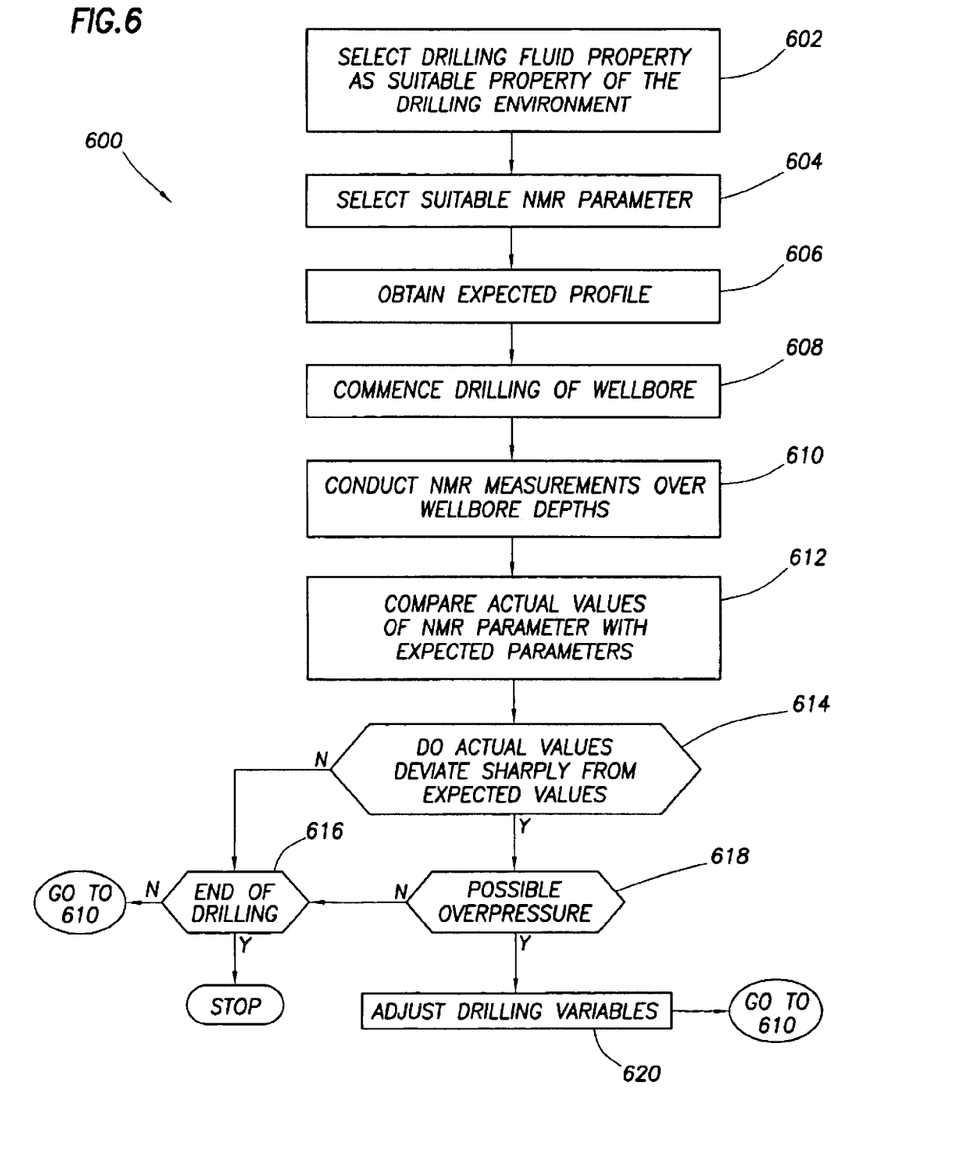
FIG. 6 is a flow chart illustrating yet another alternative method according to the invention.

Another way to detect invasion of fluid into the wellbore from the formation is to analyze the mud or drilling fluid composition in the vicinity of the tool. Since the formation fluid has different NMR properties than the mud, dilution of the mud by way of the formation fluid may be determined easily, using conventional methods. Furthermore, such measurements could be performed very close to the NMR tool, such that the signal to noise ratio would be advantageously large. Early detection of changing mud properties using this technique provides valuable early warning of a possible "kick scenario", when formation fluids begin to enter the bore hole. The method embodied in the flowchart 600 of FIG. 6 illustrates the gathering and use of this information.

Referring to flowchart 600, an initial step of the method is to select a property of the drilling environment, in this case a drilling fluid property such as drilling fluid composition (602). In one type of application; the NMR measurements focus on the constituent of the formation fluid (e.g., to evaluate the degree of invasion and/or dilution by drilling fluid). In another application, the NMR measurements focus on the constituents of the drilling fluid (e.g., to evaluate degree of invasion and/or dilution by formation fluid). In most applications, both the formation fluid and the drilling fluid areas of the near-wellbore region will be targeted.

Next, a suitable NMR parameter is selected (604), one which may be correlated with a drilling fluid property. Again, a number of NMR parameters may be selected including T2 distributions and echo shape (which may be regarded as one of several T2 acquisition properties). The values of such NMR parameters over a wellbore depth interval, or at least the behavior or variation in the values thereof, relate to the variations in the drilling fluid composition. In a subsequent step of the method, a predicted or base profile of the fluid property is obtained (606). This predicted or base profile is considered to be made up of "base" or "normal" values of the NMR parameter. Preferably, the "base" values are obtained near or at the surface, and then extrapolated over the wellbore depth interval. When a radial profile of the formation fluid-drilling fluid is sought at varying depths, the "base or normal profile" would be one where such a profile is relatively the same through a given depth interval.

Upon completion of the above initial steps, commencement of the drilling operation ensues (608). As in previous methods, NMR measurements are then conducted at a plurality of wellbore depths (610). These NMR measurements will be directed to the near wellbore region wherein the drilling fluid, mud filtrate, or formation fluid is contained. The objective of the NMR measurements is to provide monitoring of the NMR parameters attributed to the drilling fluid (the basic drilling fluid, the mud filtrate, or the formation fluid).

With a sufficient number of NMR measurements, the actual values of the NMR parameter (and thus the drilling fluid properties) may be compared with the "normal" or "base" values (612). This step may be regarded as equivalent to comparing the actual profile of the NMR parameter or drilling fluid property, with the predicted or base profile, as described previously with respect to the methods of FIGS. 4 and 5.

A subsequent operation 614 in the method, relies on the comparison of the actual and normal values. Specifically, the inquiry is whether the actual values deviate sharply from the normal values. If, indeed, this is the case, there exists a possibility (618) of an overpressure. If no sharp deviations are observed, the drilling operation may be stopped and/or the drilling variables adjusted (620), as discussed with previous methods. With the proper adjustment, the drilling operation and the monitoring of pore pressure continues.

While the invention has been described with respect to a limited number of embodiments, those skilled in the geophysical, petrophysical, and other relevant art, having the benefit of this disclosure, would appreciate that other embodiments can be devised which do not depart from the scope of the invention as disclosed herein. For example, it is contemplated that various aspects of the inventive methods may be applied to other applications concerning the gathering of information on the drilling environment or formations surrounding a wellbore. These other methods may be directed to correlating to one or more NMR parameters to pore pressure behavior, or to another physical or chemical property of the drilling environment. Accordingly, the scope of the invention should be limited only by the appended claims.

What is claimed is:

1. A method of gathering information on the pore pressure in an earth formation surrounding a wellbore, the wellbore and the surrounding earth formation defining a drilling environment, said method comprising the steps of:
    (a) selecting at least one suitable property of the drilling environment, whereby values of the suitable property over a plurality of wellbore depths can be correlated with the characteristics of the pore pressure in the earth formation;
    (b) selecting at least one NMR parameter of an NMR measurement response;
    (c) conducting an NMR measurement at a plurality of wellbore depths, thereby generating an NMR response from the drilling environment;
    (d) correlating values of the NMR parameter in the NMR response with values of the suitable property; and
    (e) determining characteristics of the pore pressure in the earth formation over the plurality of wellbore depths by comparing values of the suitable property over the plurality of depths, and correlating the correspondence between the values with the characteristics of the pore pressure over the plurality of depths.

2. The method of claim 1, wherein step (e) includes correlating values of the selected NMR parameter over a plurality of depths with values of the suitable property, and correlating values of the suitable property over the plurality of depths with the behavior of the pore pressure.

3. The method of claim 1, wherein step (a) includes selecting the suitable property from the group of suitable properties consisting of: porosity; permeability; hydrogen index; depth of drilling fluid invasion; drilling fluid properties; formation fluid properties; and combinations thereof.

4. The method of claim 1, wherein step (b) includes selecting the NMR parameter from the group of NMR parameters consisting of: T2 distributions; T1 distributions; T2 acquisition parameters; and combinations thereof.

5. The method of claim 1, wherein step (b) includes selecting T2 distribution as the NMR parameter and step (a) includes selecting porosity as the suitable property, such that step (e) includes correlating variations in the T2 distributions observed over the plurality of wellbore depths with variations in the porosity of the formation, and, thereby, with variations in the pore pressure over the plurality of depths.

6. The method of claim 1, further comprising, before step (a), the step of commencing a drilling operation to initiate forming of the wellbore, whereby the drilling operation utilizes a drilling fluid in a near-wellbore region of the drilling environment during drilling; and
    wherein step (a) includes selecting at least one suitable property of the drilling fluid during drilling, wherein step (c) includes conducting NMR measurements to generate an NMR response from the near-wellbore region, such that step (e) includes correlating variations in the drilling fluid property during drilling with variations in the pore pressure over the plurality of depths.

7. The method of claim 6, wherein step (b) includes selecting T2 distributions as the NMR parameter.

8. The method of claim 6, wherein step (c) includes providing a gradient-type NMR measurement apparatus and operating the NMR measurement apparatus to direct a gradient signal toward the surrounding near-wellbore region.

9. The method of claim 6, wherein step (a) includes selecting the composition of formation fluid in the wellbore region as the suitable property.

10. The method of claim 6, wherein step (a) includes selecting the composition of the drilling fluid during drilling as the suitable property.

11. The method of claim 6, wherein step (a) includes selecting depth of formation fluid invasion as the suitable property.

12. The method of claim 11, wherein step (e) includes establishing a formation fluid invasion profile by accounting for the depth of invasion over the plurality of depths, and correlating variations in the fluid invasion profile with variations in the pore pressure over the plurality of depths.

13. The method of claim 12, wherein step (e) includes correlating a deviation in the fluid invasion profile with the presence of an overpressure zone.

14. The method of claim 1, wherein step (d) includes comparing measured values of the NMR parameter over the plurality of depths and, from the comparisons, establishing an actual profile of the suitable property.

15. The method of claim 14, further comprising the step of:
predicting a profile of the suitable property over a plurality of depths; and
wherein step (d) includes comparing the actual profile with the predicted profile; and
wherein step (e) includes correlating deviations of the actual profile from the predicted profile with variations in the pore pressure in the surrounding earth formation.

16. The method of claim 15, wherein the step of predicting a profile includes obtaining the profile from historical information.

17. The method of claim 15, wherein step (d) includes, after conducting NMR measurements at a plurality of depths, modifying the predicted profile so as to be based, at least partly, on the actual profile.

18. The method of claim 17, further comprising, after the step of modifying the expected profile, continuing steps (c), (d) and (e).

19. The method of claim 15, further comprising the steps of:
before step (a), commencing a drilling operation in the earth formation so as to initiate forming of the wellbore;
wherein step (c) is performed during the drilling operation, and includes positioning the NMR measurement apparatus in the wellbore at each of the plurality of wellbore depths; and
during drilling, logging each of the actual profile and the predicted profile.

20. The method of claim 1, further comprising the steps of:
before step (a), commencing a drilling operation in the earth formation so as to initiate forming of the wellbore;
wherein step (c) is performed during the drilling operation, and includes positioning the NMR measurement apparatus in the wellbore at each of the plurality of wellbore depths; and
adjusting the drilling operation in response to variations in the pore pressure as determined through step (e).

21. The method of claim 20, wherein the drilling operation includes using a drilling fluid having a drilling fluid composition, and wherein the adjusting step includes changing the drilling fluid composition.

22. The method of claim 1, wherein step (c) includes providing a logging-while-drilling tool that includes the NMR measurement apparatus and positioning the NMR measurement apparatus at each of the plurality of wellbore depths.

23. The method of claim 1, further comprising, before step (c), the step of performing a drilling operation to initiate forming of the wellbore, and wherein step (c) includes providing a wireline-conveyed NMR measurement apparatus, and positioning the NMR measurement apparatus at each of the plurality of wellbore depths.

24. The method of claim 1, wherein step (c) includes continuously operating the NMR measurement apparatus over a wellbore depth interval, such that step (d) includes observing a continuous NMR response over the wellbore depth interval.

25. A method of gathering information on the pore pressure in an earth formation surrounding a wellbore, the wellbore and the surrounding earth formation defining a drilling environment, said method comprising the steps of:
(a) selecting at least one suitable property of the drilling environment, whereby variations in the suitable property over a wellbore depth interval can be correlated with variations in the pore pressure in the earth formation;
(b) predicting a profile of the suitable property over a wellbore depth interval;
(c) selecting at least one NMR parameter, such that values of the NMR parameter over the depth interval can be correlated with values of the suitable property over the depth interval;
(d) providing an NMR measurement apparatus;
(e) commencing a drilling operation so as to initiate forming of the wellbore;
(f) during drilling, lowering the NMR measurement apparatus to a depth in the wellbore and operating the NMR measurement apparatus to generate an NMR response from the drilling environment;
(g) accounting for the NMR parameter in the NMR response;
(h) repeating steps (f) and (g) at a plurality of wellbore depths to provide values of the NMR parameter and establishing therefrom, an actual profile of the suitable property; and
(i) correlating deviations of the actual profile from the predicted profile with variations in the pore pressure in the earth formation.

26. The method of claim 25, wherein step (a) includes selecting a suitable property from the group consisting of: porosity; permeability; hydrogen index; depth of drilling fluid invasion; drilling fluid properties; formation fluid properties; and combinations thereof.

27. The method of claim 26, wherein step (b) includes selecting at least one NMR parameter from the group consisting of: T2 distributions; T1 distributions; T2 acquisition parameters; and combinations thereof.

28. The method of claim 25, wherein step (a) includes selecting porosity as the suitable property and step (c) includes selecting T2 distributions as the NMR parameter, such that variations in the T2 distributions over the depth interval can be correlated with variations in the porosity of the earth formation, and thereby, with variations in the pore pressure.

29. The method of claim 28, wherein step (b) includes providing a predicted profile of porosity, wherein porosity gradually increases with depth, the method further comprising the steps of:

providing a well log including the predicted profile;

during drilling, logging the actual profile as determined through step (h); and utilizing the well log to monitor for deviations in the porosity from the predicted profile.

30. The method of claim 25, wherein step (b) includes performing measurements, prior to commencement of the drilling operation, to determine values of the suitable property and extrapolating the determined values over the depth interval, thereby establishing the predicted profile.

31. The method of claim 25, wherein step (a) includes selecting a suitable property of the drilling fluid as the suitable property and step (b) includes obtaining values of the suitable property near the surface and extrapolating the measured values over the depth interval, thereby establishing the predicted profile.

32. The method of claim 31, further comprising the steps of:

monitoring for deviations of the actual profile from the predicted profile; and correlating certain deviations of the actual profile to the dilution of the drilling fluid with formation fluid, and, thereby, with the presence of an overpressure zone.

33. The method of claim 25, wherein step (a) includes selecting depth of invasion of drilling fluid as the suitable property, and wherein the predicted profile in step (b) is characterized by a relatively constant depth of invasion profile over the depth interval.

34. The method of claim 25, wherein the step of establishing an actual profile in step (h) includes logging the selected suitable property over the depth interval.

35. The method of claim 25, wherein step (h) includes periodically modifying the predicted profile so as to be based, at least partly, on the actual profile.

36. The method of claim 25, further comprising, after step (i), the step of adjusting the drilling operation in response to variations in the pore pressure as determined through step (i).

37. The method of claim 36, wherein step (e) includes performing the drilling operation using drilling fluid having a fluid composition, and wherein the adjusting step includes adjusting the fluid composition in response to variations in the pore pressure as determined through step (i).

38. The method of claim 25, further comprising the steps of:

logging the predicted profile;

logging the actual profile while drilling;

wherein step (i) includes continuously monitoring, during drilling, for deviations of the predicted profile from the expected profile.

39. A method of drilling a wellbore in an earth formation, the wellbore and the surrounding earth formation defining a drilling environment, the method comprising the steps of:

(a) commencing drilling of the wellbore in the earth formation, using drilling fluid having a fluid composition; and (b) while drilling, monitoring the pore pressure in the earth formation surrounding the wellbore, including selecting at least one suitable property of the drilling environment, such that variations in the suitable property over wellbore depths can be correlated with variations in pore pressure in the earth formation; obtaining NMR measurements at a plurality of wellbore depths, thereby obtaining an NMR response from the surrounding wellbore over the plurality of wellbore depths;

from the NMR response, determining the behavior of the suitable property over the wellbore depths; and correlating the behavior of the suitable property over the wellbore depths with the behavior of the pore pressure in the earth formation.

40. The method of claim 39, further comprising, after step (c), the step of adjusting the drilling operation in response to variations in the pore pressure as determined in step (b).

41. The method of claim 40, wherein the adjusting step includes adjusting the fluid composition of the drilling fluid.

42. The method of claim 39, wherein the adjusting step includes changing the density of the drilling fluid.

43. The method of claim 39, further comprising the step of:

selecting at least one NMR parameter, whereby the NMR parameter can be evaluated from the NMR response and such that measured values of the NMR parameter can be correlated with values of the selected suitable property; and wherein step (b) includes accounting values of the NMR parameter in the NMR response and correlating the behavior of the NMR parameter over a plurality of wellbore depths with the behavior of the suitable property.

44. The method of claim 43, wherein step (b) includes selecting T2 distribution as the NMR parameter thereof.

45. The method of claim 44, wherein step (b) includes logging the NMR property and the suitable property over the plurality of wellbore depths.

46. The method of claim 39, wherein step (b) includes obtaining NMR measurements, wherein the NMR responses generated are from formation fluid and drilling fluid occupying a near-wellbore region of the drilling environment.

47. The method of claim 39, further comprising the steps of:

(c) selecting at least one NMR parameter, such that the NMR parameter can be evaluated from the NMR response and such that variations in the NMR parameter can be correlated with variations in the selected suitable property; and (d) obtaining predicted values of the NMR parameter over the plurality of wellbore depths; and wherein step (b) further includes comparing predicted values of the NMR parameter with actual values obtained from the NMR measurements, and from the comparisons, correlating the correspondence between the predicted values and the actual values with the behavior of the suitable property, thereby determining the behavior of the pore pressure.

48. The method of claim 47, wherein step (b) includes selecting drilling fluid composition as the suitable property, and obtaining NMR measurements such that the NMR response is from a near-wellbore region of the drilling environment; and wherein step (d) includes establishing the predicted values by obtaining values of the NMR parameter from NMR measurements taken at or near the surface of the wellbore.

49. The method of claim 48, wherein step (b) includes correlating deviations of the actual values of the NMR parameter from the predicted values to variations in pore pressure, the method further comprising the step of:

changing the drilling fluid composition in response to variations in pore pressure as determined through step (b).

50. The method of claim 47, wherein step (b) includes selecting depth of formation fluid invasion as the suitable property, wherein step (c) includes selecting at least one NMR parameter from the group of NMR parameters consisting of T2 distribution; T1 distribution; and combinations thereof; and wherein step (d) includes establishing a substantially constant set of predicted values as the predicted values over the plurality of wellbore depths.

51. The method of claim 50, wherein step (b) includes correlating deviations of the actual values from the predicted values with variations in the suitable property, thereby determining the behavior of the pore pressure.

52. A method of drilling a wellbore in an earth formation, the wellbore and the surrounding earth formation defining a drilling environment, the method comprising the steps of:

(a) selecting at least one suitable property of the drilling environment, the suitable property being a property of drilling fluid provided in a near-wellbore region of the drilling environment during drilling, whereby variations in the suitable property over a wellbore depth interval can be correlated with variations in the pore pressure in the earth formation;

(b) selecting at least one NMR parameter, whereby variations in the NMR parameter over the depth interval can be correlated with variations in the suitable property;

(c) commencing a drilling operation so as to initiate forming of the wellbore;

(d) during drilling, conducting NMR measurements at a plurality of wellbore depths to generate an NMR response from the near-wellbore region;

(e) correlating values of the NMR parameter in the NMR response with values of the suitable property; and (f) determining the behavior of the pore pressure in the earth formation by comparing values of the suitable property over the depth interval.

53. The method of claim 52, wherein step (f) includes correlating variations in the values of the suitable property with variations in pore pressure over the depth interval.

54. The method of claim 53, wherein step (a) includes selecting depth of formation fluid invasion as the suitable property.

55. The method of claim 54, wherein step (b) includes selecting T2 distribution as the NMR parameter.

56. The method of claim 54, wherein step (a) further includes selecting mud filtrate content in an invaded region of the near-wellbore region as the suitable property;

wherein step (a) includes conducting the NMR measurements to generate a response from the invaded region; and wherein step (f) includes correlating variations in the mud filtrate content with variations in the depth of invasion, thereby correlating variations in the mud filtrate content with variations in the pore pressure over the depth interval.

57. The method of claim 54, further comprising the step of monitoring for an overpressure zone by monitoring for deviations in the NMR parameter over the depth interval.

58. The method of claim 52, wherein step (a) includes selecting drilling fluid composition during drilling as the suitable property.

59. The method of claim 58, wherein step (a) includes selecting formation fluid content in the drilling fluid composition as the suitable property; and wherein step (f) includes correlating variations in the formation fluid content with variations in the pore pressure over the depth interval.

60. The method of claim 52, further comprising the steps of:

during drilling, logging the NMR parameter and the suitable property; and adjusting the drilling operation upon occurrence of certain variations in the suitable property, including adjusting the composition of the drilling fluid.

61. A system for gathering information on the pore pressure in an earth formation surrounding a wellbore, the wellbore and the surrounding earth formation defining a drilling environment, the system comprising:

an NMR measurement apparatus for conducting an NMR measurement at a plurality of wellbore depths and for receiving an NMR response from the drilling environment;

a microprocessor disposed in communication with the NMR measurement apparatus so as to receive NMR response data therefrom, the microprocessor including an executable program configured for:

selecting a suitable property of the drilling environment, such that values of the suitable property over a plurality of wellbore depths can be correlated with the characteristics of the pore pressure in the earth formation;

accounting for at least one NMR parameter in the NMR response; and correlating values of the NMR parameter over a plurality of depths with the behavior of the suitable property over the plurality of depths, thereby correlating values of the NMR parameter with the behavior of the pore pressure over the plurality of depths; and a tangible medium for displaying the behavior of the suitable property over the plurality of wellbore depths.

62. The system of claim 61, wherein the tangible medium is a well log displaying a profile of the suitable property over the plurality of depths; and a base profile providing predicted values of the suitable property over the plurality of depths.

63. The system of claim 62, wherein the tangible medium includes an indication for pore pressure conditions over the plurality of depths.

* * * * *